(12) United States Patent
Greenwood et al.

(10) Patent No.: US 8,627,637 B2
(45) Date of Patent: Jan. 14, 2014

(54) METHOD AND MACHINE FOR THE MANUFACTURE OF AIR PILLOWS

(75) Inventors: John Stuart Greenwood, Suffolk (GB); Neil Glynn Price, Wambez (FR)

(73) Assignee: Pregis Innovative Packaging, Inc., Deerfield, IL (US)

( * ) Notice: Subject to any disclaimer, the term of this patent is extended or adjusted under 35 U.S.C. 154(b) by 801 days.

(21) Appl. No.: 10/940,590

(22) Filed: Sep. 13, 2004

(65) Prior Publication Data

US 2005/0204700 A1 Sep. 22, 2005

Related U.S. Application Data

(63) Continuation-in-part of application No. 10/088,095, filed as application No. PCT/GB99/03174 on Sep. 22, 1999, now Pat. No. 6,789,376.

(60) Provisional application No. 60/589,748, filed on Jul. 2, 2004.

(51) Int. Cl.
*B65B 31/00* (2006.01)
*B65B 9/00* (2006.01)

(52) U.S. Cl.
USPC ............................................................. 53/55

(58) Field of Classification Search
USPC ........... 53/450, 451, 550, 551, 459, 403, 568, 53/79, 55
See application file for complete search history.

(56) References Cited

U.S. PATENT DOCUMENTS

| | | |
|---|---|---|
| 2,877,609 A | 3/1959 | Bodolay et al. |
| 2,987,864 A | 6/1961 | Miller ............................. 53/390 |
| 3,043,071 A | 7/1962 | Sadell ............................. 53/390 |
| 3,172,246 A | 3/1965 | Ruff ............................... 53/198 |
| 3,262,833 A | 7/1966 | Zelnick ........................ 156/583 |
| 3,303,628 A | 2/1967 | Lovas et al. ...................... 53/22 |
| 3,359,703 A | 12/1967 | Quaadgrm ........................ 53/59 |

(Continued)

FOREIGN PATENT DOCUMENTS

| | | |
|---|---|---|
| DE | 19913408 | 10/2000 |
| EP | 0155109 | 9/1985 |

(Continued)

OTHER PUBLICATIONS

Patent Abstracts of Japan, vol. 1995, No. 4 (May 31, 1995), Publication No. 07016961.

(Continued)

*Primary Examiner* — Alexandra Elve
*Assistant Examiner* — John Paradiso
(74) *Attorney, Agent, or Firm* — Dorsey & Whitney LLP

(57) ABSTRACT

Devices and methods for forming air pillows are described. In accordance with embodiments of the invention, an apparatus for manufacturing air-filled pillows from a tube material includes a plurality of support rollers, a drive means, an injector means, and a sealing means. The plurality of support rollers support a roll of a tube material along an outer circumferential extent of the roll, in which the tube material includes two opposing sheets joined along at least one longitudinal edge thereof. The drive means draws the tube material from the roll along the support rollers, the injector means injects air into an interior space between the two opposing sheets of the tube material drawn from the roll, and the sealing means seals the two opposing sheets together with the injected air entrapped in the interior space therebetween.

13 Claims, 10 Drawing Sheets

(56) References Cited

U.S. PATENT DOCUMENTS

| | | | |
|---|---|---|---|
| 3,389,534 A | 6/1968 | Pendleton | |
| 3,397,633 A | 8/1968 | Harris | |
| 3,488,244 A | 1/1970 | Lepisto | |
| 3,492,783 A | 2/1970 | Dohmeier | |
| 3,552,091 A | 1/1971 | Johnston III, et al. | 53/198 |
| 3,559,874 A | 2/1971 | Titchenal | |
| 3,575,757 A | 4/1971 | Smith | |
| 3,596,428 A | 8/1971 | Young et al. | |
| 3,660,189 A | 5/1972 | Troy | |
| 3,667,593 A | 6/1972 | Pendleton | |
| 3,703,430 A | 11/1972 | Rich | 156/497 |
| 3,791,573 A | 2/1974 | Titchenal et al. | |
| 3,813,845 A | 6/1974 | Weikert | 53/37 |
| 3,817,803 A | 6/1974 | Horsky | |
| 3,868,285 A | 2/1975 | Troy | 156/147 |
| 3,902,677 A | 9/1975 | Wolf | 242/66 |
| 3,914,917 A | 10/1975 | Young | 53/22 |
| 3,921,928 A * | 11/1975 | Henry | 242/420.1 |
| 3,938,298 A | 2/1976 | Luhman et al. | |
| 4,017,351 A | 4/1977 | Larson et al. | |
| 4,021,283 A | 5/1977 | Weikert | |
| 4,040,513 A * | 8/1977 | Walls | 198/530 |
| 4,049,854 A | 9/1977 | Casey et al. | |
| 4,076,872 A | 2/1978 | Lewicki et al. | |
| 4,096,306 A | 6/1978 | Larson | |
| 4,169,002 A | 9/1979 | Larson | |
| 4,169,344 A | 10/1979 | Ganz et al. | |
| 4,213,284 A * | 7/1980 | Silverman et al. | 53/74 |
| 4,412,879 A | 11/1983 | Ottaviano | |
| 4,415,398 A | 11/1983 | Ottaviano | |
| 4,551,379 A | 11/1985 | Kerr | 428/200 |
| 4,564,407 A | 1/1986 | Tsuruta | 156/147 |
| 4,576,669 A | 3/1986 | Caputo | 156/145 |
| 4,619,635 A | 10/1986 | Ottaviano | |
| 4,644,733 A | 2/1987 | Dolinar | |
| 4,680,073 A | 7/1987 | Brunner et al. | 156/250 |
| 4,714,506 A | 12/1987 | Yamashiro et al. | |
| 4,793,124 A * | 12/1988 | Anderson | 53/588 |
| 4,834,830 A | 5/1989 | Heeler et al. | 156/583.1 |
| 4,847,126 A | 7/1989 | Yamashiro et al. | |
| 4,850,912 A | 7/1989 | Koyanagi | |
| 4,894,264 A | 1/1990 | Akao et al. | |
| 4,894,265 A | 1/1990 | Chang et al. | |
| 4,936,079 A | 6/1990 | Skalsky et al. | 53/219 |
| 4,941,754 A | 7/1990 | Murdock | 383/3 |
| 4,981,006 A | 1/1991 | Caenazzo et al. | 53/388 |
| 5,070,675 A | 12/1991 | Chuan-Shiang | |
| 5,187,917 A | 2/1993 | Mykleby | 53/434 |
| 5,203,761 A | 4/1993 | Reichental et al. | |
| 5,216,868 A * | 6/1993 | Cooper et al. | 53/79 |
| 5,257,492 A | 11/1993 | Watts | |
| 5,312,132 A | 5/1994 | Pillet | |
| 5,340,632 A | 8/1994 | Chappuis | |
| 5,427,830 A | 6/1995 | Pharo | |
| 5,454,642 A | 10/1995 | De Luca | |
| 5,500,067 A | 3/1996 | Jenkner | |
| 5,535,888 A | 7/1996 | De Luca | |
| 5,552,003 A | 9/1996 | Hoover et al. | |
| 5,575,435 A | 11/1996 | Sperry et al. | 242/421.4 |
| 5,581,983 A | 12/1996 | Murakami | |
| 5,588,533 A | 12/1996 | Farison et al. | |
| 5,620,096 A | 4/1997 | Pozzo | |
| 5,651,237 A | 7/1997 | De Luca | 53/472 |
| 5,660,662 A | 8/1997 | Testone | |
| 5,673,541 A | 10/1997 | Arzuman et al. | |
| 5,693,163 A | 12/1997 | Hoover et al. | 156/147 |
| 5,715,647 A | 2/1998 | Keim et al. | 53/374.5 |
| 5,722,215 A * | 3/1998 | Yuyama | 53/374.4 |
| 5,755,082 A | 5/1998 | Takahashi et al. | |
| 5,755,328 A | 5/1998 | DeLuca | |
| 5,824,392 A | 10/1998 | Gotoh et al. | |
| 5,862,914 A | 1/1999 | Farison et al. | |
| 5,873,215 A * | 2/1999 | Aquarius et al. | 53/403 |
| 5,937,614 A * | 8/1999 | Watkins et al. | 53/79 |
| 5,938,877 A | 8/1999 | Schram | |
| 5,942,076 A * | 8/1999 | Salerno et al. | 156/359 |
| RE36,501 E | 1/2000 | Hoover et al. | |
| 6,015,047 A | 1/2000 | Greenland | |
| 6,035,611 A | 3/2000 | Lerner | 53/455 |
| RE36,759 E * | 7/2000 | Hoover et al. | 156/147 |
| 6,116,000 A | 9/2000 | Perkins et al. | |
| 6,170,227 B1 | 1/2001 | Kovacs et al. | |
| 6,195,966 B1 * | 3/2001 | Shomron et al. | 53/451 |
| 6,199,349 B1 | 3/2001 | Lerner | |
| 6,209,286 B1 | 4/2001 | Perkins et al. | 53/403 |
| 6,213,167 B1 | 4/2001 | Greenland | |
| 6,253,806 B1 | 7/2001 | Sperry et al. | |
| 6,253,919 B1 | 7/2001 | Sperry et al. | |
| 6,272,815 B1 | 8/2001 | Todd et al. | 53/562 |
| 6,341,473 B1 * | 1/2002 | Kovacs et al. | 53/450 |
| 6,375,785 B1 | 4/2002 | Aquarius | 156/252 |
| 6,410,119 B1 | 6/2002 | De Luca et al. | 428/166 |
| 6,421,985 B1 | 7/2002 | Simmons, Jr. et al. | |
| 6,423,166 B1 | 7/2002 | Simhaee | 156/156 |
| 6,453,644 B1 * | 9/2002 | Baker | 53/403 |
| 6,460,313 B1 * | 10/2002 | Cooper | 53/79 |
| 6,472,638 B1 | 10/2002 | Sperry et al. | 219/243 |
| 6,503,182 B2 | 1/2003 | Toth | 493/238 |
| 6,519,916 B1 | 2/2003 | Brown | |
| 6,536,183 B1 | 3/2003 | Brown | |
| 6,550,229 B2 | 4/2003 | Sperry et al. | |
| 6,565,946 B2 | 5/2003 | Perkins et al. | |
| 6,569,283 B1 | 5/2003 | Sperry et al. | |
| 6,582,800 B2 | 6/2003 | Fuss et al. | |
| D480,971 S | 10/2003 | DeLuca et al. | |
| 6,659,150 B1 | 12/2003 | Perkins et al. | 156/378 |
| 6,786,022 B2 | 9/2004 | Fuss et al. | 53/403 |
| 6,800,162 B2 | 10/2004 | Kannankeril et al. | 156/145 |
| 6,804,933 B2 | 10/2004 | Sperry et al. | 55/403 |
| 2001/0000719 A1 | 5/2001 | Lerner et al. | |
| 2001/0001921 A1 | 5/2001 | Sperry et al. | |
| 2001/0013215 A1 | 8/2001 | Fuss et al. | |
| 2001/0049921 A1 | 12/2001 | Sperry et al. | |
| 2002/0092279 A1 | 7/2002 | Sperry et al. | |
| 2002/0108351 A1 | 8/2002 | Sperry et al. | |
| 2002/0108352 A1 | 8/2002 | Sperry et al. | |
| 2002/0108697 A1 | 8/2002 | Perkins et al. | |
| 2002/0112808 A1 | 8/2002 | Perkins et al. | |
| 2002/0129583 A1 | 9/2002 | Simmons, Jr. et al. | |
| 2002/0150730 A1 | 10/2002 | De Luca et al. | |
| 2002/0162301 A1 * | 11/2002 | Davey | 53/403 |
| 2002/0189752 A1 | 12/2002 | Wetsch | |
| 2003/0041566 A1 | 3/2003 | Hilbert, Sr. et al. | |
| 2003/0079439 A1 | 5/2003 | Brown | |
| 2003/0089082 A1 | 5/2003 | Fuss et al. | |
| 2003/0118778 A1 | 6/2003 | Perkins et al. | |
| 2004/0206050 A1 | 10/2004 | Fuss et al. | 53/403 |

FOREIGN PATENT DOCUMENTS

| | | |
|---|---|---|
| EP | 0256346 A2 | 2/1988 |
| EP | 0315882 | 5/1989 |
| EP | 0240827 | 11/1989 |
| EP | 0399965 | 11/1990 |
| EP | 0401414 | 12/1990 |
| EP | 0256346 B1 | 10/1991 |
| EP | 0345235 | 10/1991 |
| EP | 0269145 | 3/1992 |
| EP | 0512187 | 11/1992 |
| EP | 0329496 | 1/1993 |
| EP | 0523382 A | 1/1993 |
| EP | 0513235 | 10/1993 |
| EP | 0611697 B1 | 8/1994 |
| EP | 0679588 B1 | 11/1995 |
| EP | 0523382 B | 9/1996 |
| EP | 0787574 | 8/1997 |
| EP | 0796802 | 9/1997 |
| EP | 0816228 A2 | 1/1998 |
| EP | 0836926 | 4/1998 |
| EP | 0816228 A3 | 5/1998 |
| EP | 0805769 | 8/1998 |
| EP | 0689929 | 9/1998 |
| EP | 0718195 | 2/1999 |
| EP | 0810958 | 12/1999 |

(56) References Cited

FOREIGN PATENT DOCUMENTS

| | | |
|---|---|---|
| EP | 0978455 A2 | 2/2000 |
| EP | 1013573 | 6/2000 |
| EP | 0978455 A3 | 7/2000 |
| EP | 1022124 | 7/2000 |
| EP | 1022234 | 7/2000 |
| EP | 0701954 | 10/2000 |
| EP | 1044793 | 10/2000 |
| EP | 0935521 | 12/2000 |
| EP | 1138596 | 10/2001 |
| EP | 1161932 | 12/2001 |
| EP | 941933 B1 | 11/2002 |
| EP | 1280 651 B1 | 4/2006 |
| FR | 2389547 | 12/1978 |
| FR | 2580597 | 10/1986 |
| FR | 2678897 | 1/1993 |
| JP | 07165267 * | 6/1995 |
| NL | 1011096 | 1/1999 |
| WO | WO 89/0655/7 | 7/1989 |
| WO | WO 9301107 | 1/1993 |
| WO | WO 94/0767/8 | 4/1994 |
| WO | WO 96/2292/6 | 8/1996 |
| WO | WO 98/2613/7 | 8/1996 |
| WO | WO 97/2075/6 | 6/1997 |
| WO | WO 98/2350/2 | 6/1998 |
| WO | WO 98/4027/6 | 9/1998 |
| WO | WO 99/0240/9 | 1/1999 |
| WO | WO 99/4610/3 | 9/1999 |
| WO | WO 99/4618/2 | 9/1999 |
| WO | WO 00/2761/9 | 5/2000 |
| WO | WO 00/4319/8 | 7/2000 |
| WO | WO 00/43270 | 7/2000 |
| WO | WO 00/5350/1 | 9/2000 |
| WO | WO 0064672 | 11/2000 |
| WO | WO 01/2139/1 | 3/2001 |
| WO | WO 01/5315/3 | 7/2001 |
| WO | WO 01/8543/4 | 11/2001 |
| WO | WO 02/1415/6 | 2/2002 |
| WO | WO 02/2658/9 | 4/2002 |
| WO | WO 02/055288 A2 | 7/2002 |
| WO | WO 02/6435/9 | 8/2002 |

OTHER PUBLICATIONS

Patent Abstracts of Japan, vol. 1995, No. 9 (Oct. 31, 1995), Publication No. 07165267.

Brochure: Packaging Systems, Pactiv Advanced Packaging Solutions; Pactiv Corporation 1996, 6 color pages.

* cited by examiner

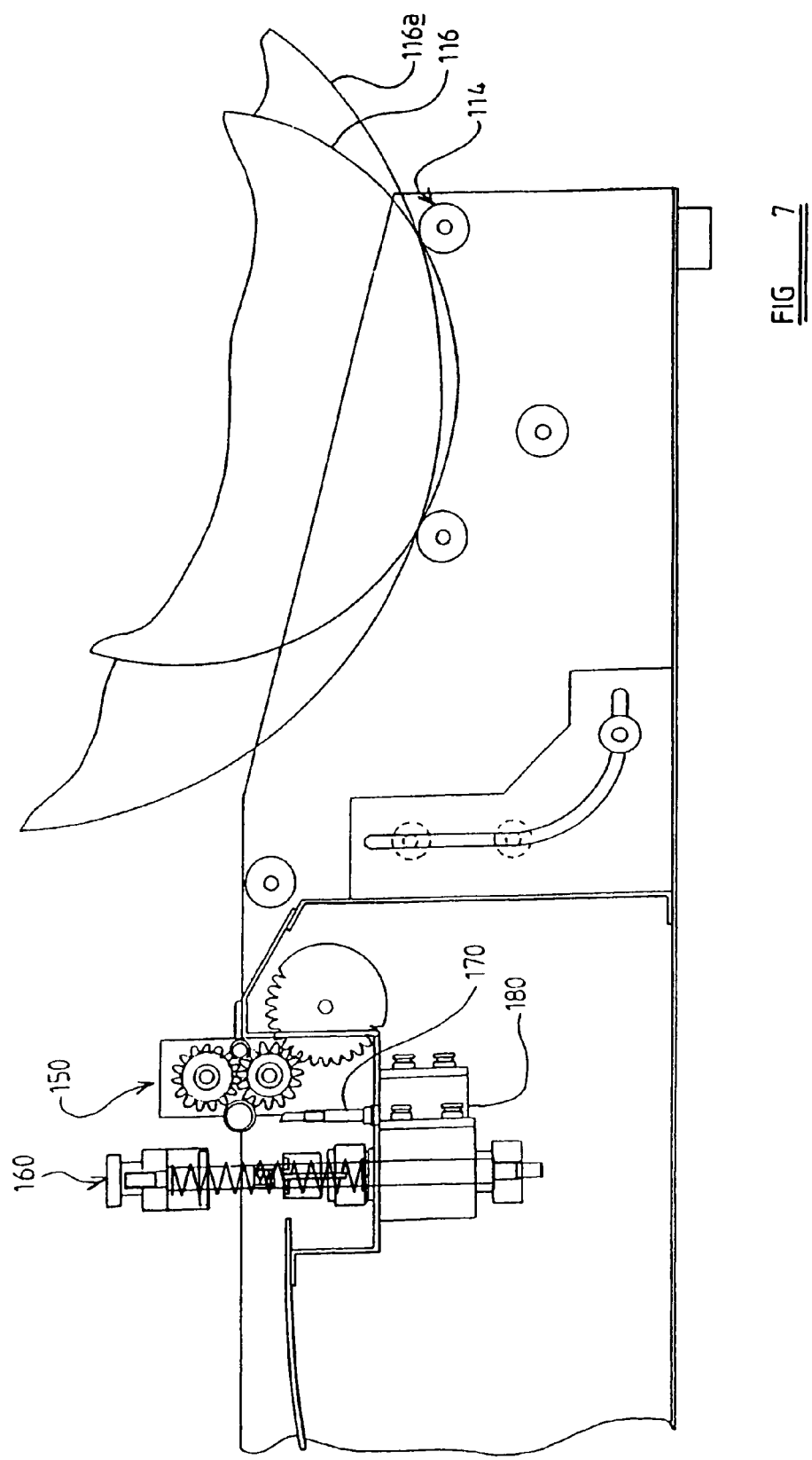

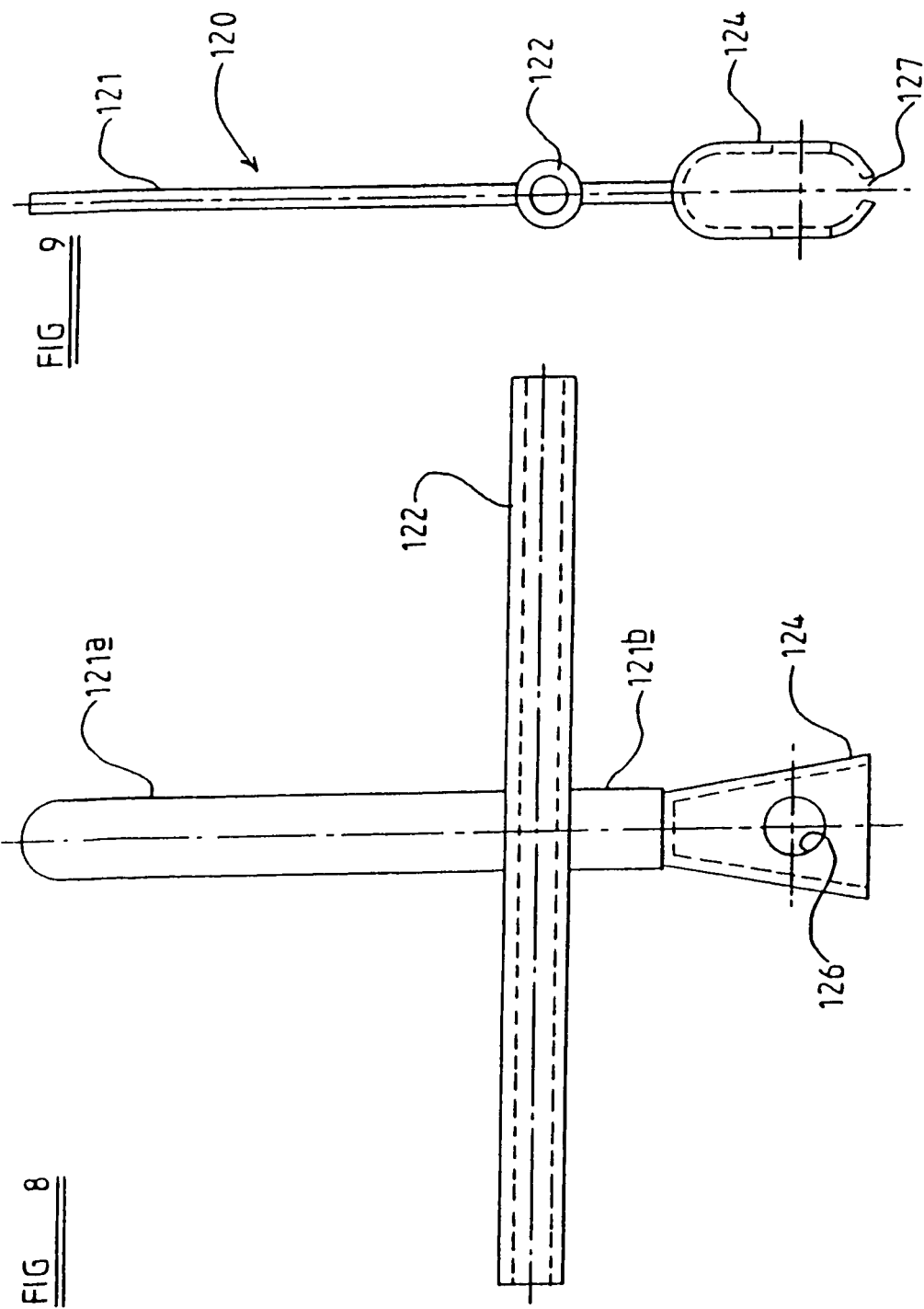

METHOD AND MACHINE FOR THE MANUFACTURE OF AIR PILLOWS

REFERENCE TO RELATED APPLICATIONS

This application is a continuation in part of U.S. patent application Ser. No. 10/088,095, issued as U.S. Pat. No. 6,789,376 on Sep. 14, 2004, which is a national stage of International Patent Application Serial No. PCT/GB99/03174, filed on Sep. 22, 1999. The subject matter of this application also is related to that of U.S. patent application Ser. Nos. 10/360,390, issued as 6,932,134 on Aug. 23, 2005 and 60/589,748. Each of the foregoing patent applications is expressly incorporated by reference herein in its entirety.

FIELD OF THE INVENTION

This invention is concerned with improvements relating to the manufacture of air pillows, in particular air pillows of thin-walled plastic sheet which may be used as an infill or cushioning in the packaging and transportation of fragile articles.

BACKGROUND OF THE INVENTION

Conventionally utilized in the manufacture of air-filled pillows is thin walled polythene (a.k.a. polyethylene) tubing, which may be unwound from a continuous supply thereof flat-wound on a reel, and it is in this context that the invention will hereinafter be described, although it is to be appreciated that the invention is not limited to the use of polythene as such, and that other appropriate materials may be utilized as desired.

Numerous suggestions have been made for the manufacture of air-filled pillows of this kind (hereinafter referred to as being of the kind specified), but in general difficulty has been encountered in the injection of air into a section of tubing, and subsequently sealing the tube to form individual pillows.

Examples of such apparatus or systems include U.S. Pat. Nos. 3,366,523, 3,667,593, 3,817,803, 3,868,285, 4,017,351, 4,049,854, 5,824,392, 6,209,286, 6,410,119, 6,582,800, and 6,659,150, and U.S. Patent Application Pub. No. 2003/0163976, each of which is incorporated by reference herein in its entirety.

SUMMARY OF THE INVENTION

According to one aspect of the invention there is provided a machine for the manufacture of air-filled pillows comprising, among other things,
  a) a separator member which may be inserted into a length of plastic tubing drawn from a supply thereof;
  b) retaining means for retaining the separator member in a desired position in the machine, within the tubing, in such a manner as to allow the tubing to be pulled across the separator member;
  c) an injector means co-operable with the separator member to inject air through one wall of the tubing into the interior of the tubing; and
  d) sealing means to seal the tube across the location of the injection point.

By the use of a separator member which is captive within the polythene tubing to separate the walls of the tubing, injection of air through an aperture in the tubing may more reliably be accomplished without the risk of puncturing the tubing at two locations. Specifically by the use of the separator member, such injection may be accomplished without the need for air pressure within the machine to hold the walls of the tube apart, while injection is taking place.

Preferably the separator member additionally provides a supporting surface to support one wall of the tubing whilst an injection nozzle is inserted through the wall, during the injection of air into the space between the walls of the tubing.

Preferably the machine comprises drive means to draw tubing material from the supply thereof, conveniently by intermittent operation.

Preferably the machine comprises control means for the injector means, the drive means and the sealing means, which is operative to cause the injector means to operate while operation of the drive means is momentarily terminated, and subsequent to operation of the injector means to cause the drive means to advance the material a short distance to the sealing means.

Preferably the machine comprises a support member located adjacent to the separator member and between which one wall of the tube is located as the tube is advanced through the machine, and conveniently the support member is provided with an aperture in alignment with an aperture provided in the separator member, through which a nozzle of the injector means passes in the injection of air into the tube.

The retaining means for the separator member may be provided by a housing in which part of the separator member is located in a manner such as to prevent any substantial movement of the separator member from a desired position within the machine, particularly as tends to occur as the tubing is drawn over the separator member in the operation of the machine, but such as to allow the polythene tubing to be drawn through the housing over the separator member as the tubing is advanced through the machine.

Conveniently the housing is split, comprising portions which may be secured together so as to extend partially at least around the separator member whilst within the tube.

Alternatively the retaining means may be provided by one or more drive rollers of the machine with which the separator member is drawn into engagement as the drive means operates to draw tubing through the machine.

Preferably the sealing means is operative to seal the tube along two lines extending transversely of the tube on opposite sides of the injection point, and to provide a tear-line extending between the two seal lines.

According to another aspect of the invention there is provided a machine for the manufacture for air-filled pillows from a continuous supply of plastic tube flatwound onto a reel, the machine comprising, among other things,
  a) a drive assembly to advance the plastic tube intermittently through the machine;
  b) injection means operative intermittently to inject air into the space between upper and lower walls of the tube; and
  c) sealing means operative downstream of the injection means intermittently to seal the upper and lower walls of the tube;
  characterised in that a separator member is provided which is located within the tube between the upper and lower walls thereof upstream of the injection means, said separator member being maintained in an operative position within the machine during advancement of the tube through the machine by engagement with the drive assembly.

Conveniently said engagement is indirect, in the sense that the separator member engages the drive assembly through the thickness of the polythene tube.

Conveniently the drive assembly engages the tube to draw the tube over the separator member whilst preventing substantial movement of the separator member from a desired position relative to the machine.

Preferably the drive assembly comprises upper and lower rollers operative to engage the upper and lower walls of the tube.

Advantageously the separator member is adapted to co-operate with the injector means, and comprises an aperture through which a nozzle of the injector means passes in the injection of air into the space between the upper and lower walls of the tube.

According to another aspect of the invention there is provided a method of making an air-filled pillow involving the use of continuous thin-walled plastic tube, in which the walls of the tube are retained apart by a separator member which is retained in position whilst the plastic film is drawn from a supply thereof, the separator member retaining the walls of the tube separated during the injection of air into the tube.

An apparatus for manufacturing air-filled pillows from a tube material is also disclosed and includes, among other things, a plurality of support rollers, a drive means, an injector means, and a sealing means.

In accordance with one aspect of the invention, the plurality of support rollers support a roll of a tube material along an outer circumferential extent of the roll. The tube material includes two opposing sheets joined along at least one longitudinal edge thereof. In some embodiments, the tube material is joined along both longitudinal edges. The tube material can be made of a polymer, such as polythene. The support rollers can form a cradle.

In accordance with another aspect of the invention, the drive means draws the tube material from the roll along the support rollers. The drive means can include cooperating drive rollers to engage the tube material.

In accordance with another aspect of the invention, the injector means injects air into an interior space between the two opposing sheets of the tube material drawn from the roll. The injector means can include a nozzle, and the nozzle can include a tubular member with an aperture defined therein.

In accordance with another aspect of the invention, the sealing means seals the two opposing sheets together with the injected air entrapped in the interior space therebetween. The sealing means can include at least one heating element to form a seal line joining the two opposing sheets together.

In accordance with another aspect of the invention, a housing is provided for the drive means, the injector means, and the sealing means. Each of the support rollers can be mounted on at least one upstanding wall of the housing.

In accordance with another aspect of the invention, a control means is provided for controlling operation of at least one of the drive means, the injector means, and the sealing means. The at least one of the drive means, the injector means, and the sealing means can be operated intermittently by the control means.

In accordance with another aspect of the invention, a perforator is provided for perforating the tube material drawn from the roll.

There will now be given a detailed description, to be read with reference to the accompanying drawings, of two machines for the manufacture of air-filled pillows, which are preferred embodiments of the invention, having been selected for the purposes of illustrating the invention by way of example, the method of operation of the machines in the making of an air-filled pillow also being illustrative of the invention in certain of its aspects.

BRIEF DESCRIPTION OF THE DRAWINGS

In the accompanying drawings:

FIG. 7 is a side elevation of the machine which is the second embodiment of the invention;

FIGS. 8 and 9 are respectively plan and side elevation views of the separator member of the second embodiment;

DETAILED DESCRIPTION

Figure 1:
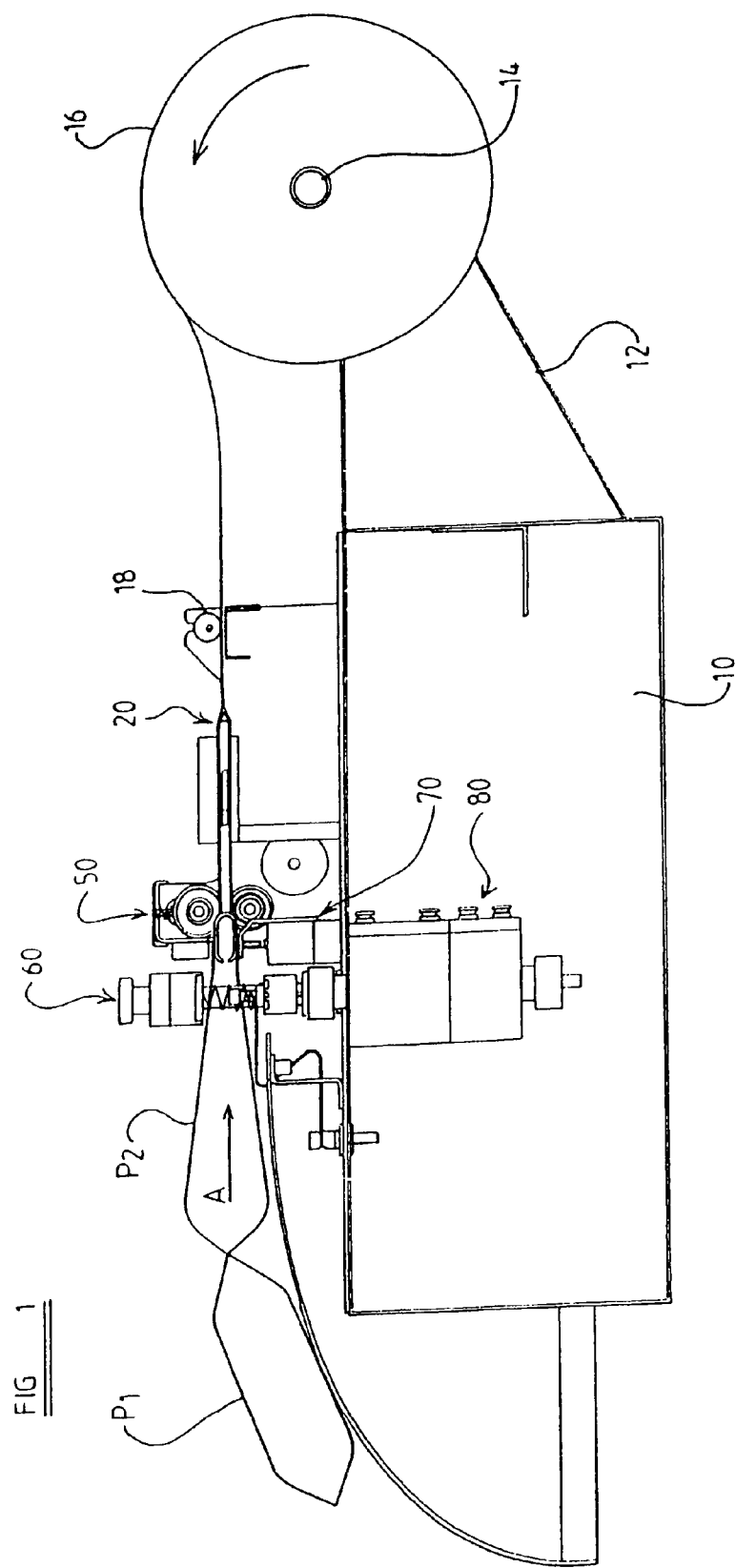
FIG. 1 is a side elevation of the machine which is the first embodiment of the invention.
Figure 2:
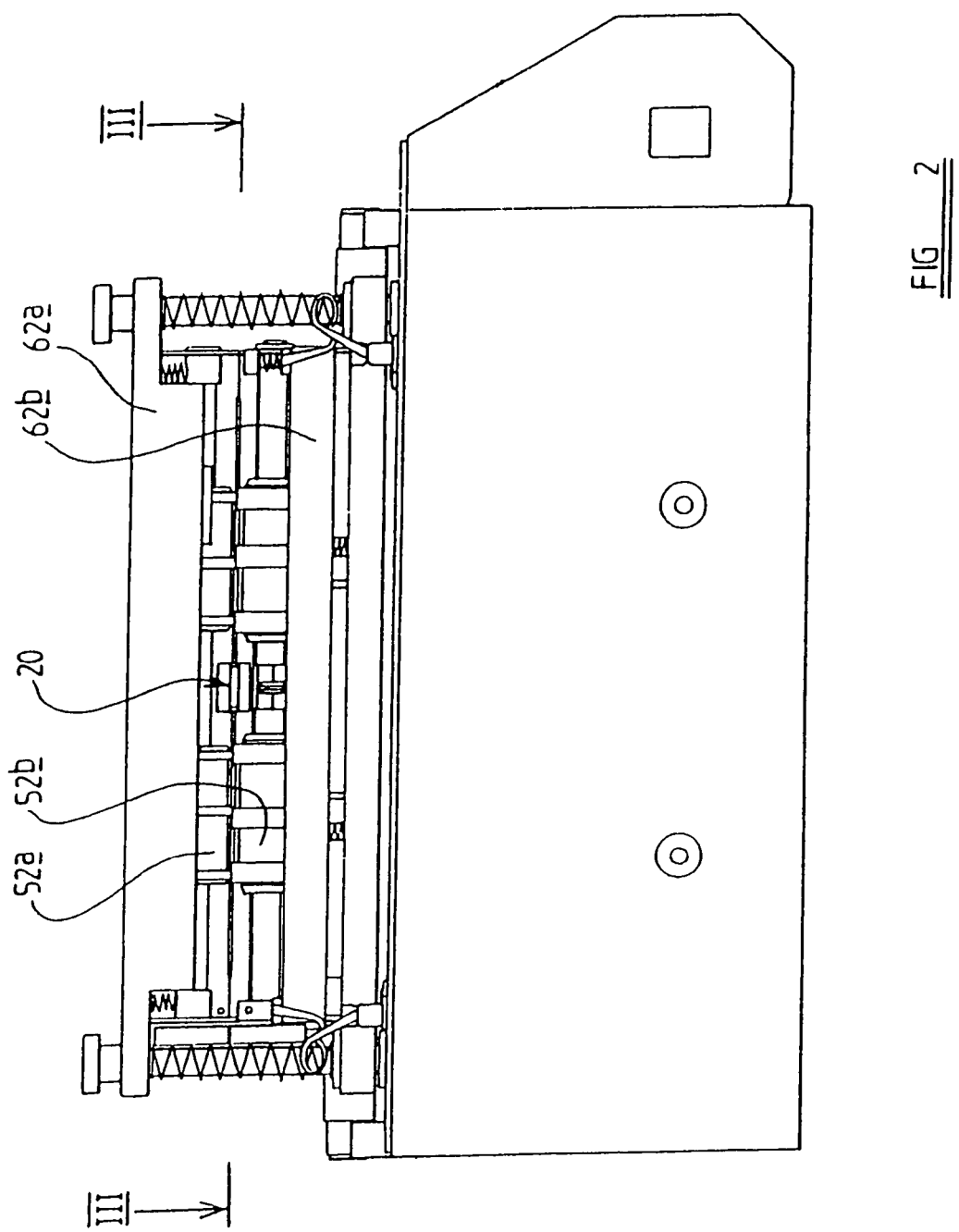
FIG. 2 is a front view of the machine, taken in the direction of the arrow A of FIG. 1.

The machine which is the first embodiment of this invention is for the manufacture of air-filled pillows which may be used as infill and cushioning in the packaging and transportation of fragile articles. The machine comprises a housing 10 from which side arms 12 extend rearwardly to a mounting 14 upon which a roll 16 of thin-walled plastic tube is mounted, and from which tube may be drawn in the form of a flat sheet, towards a guide roller 18 of the machine.

Figure 5:
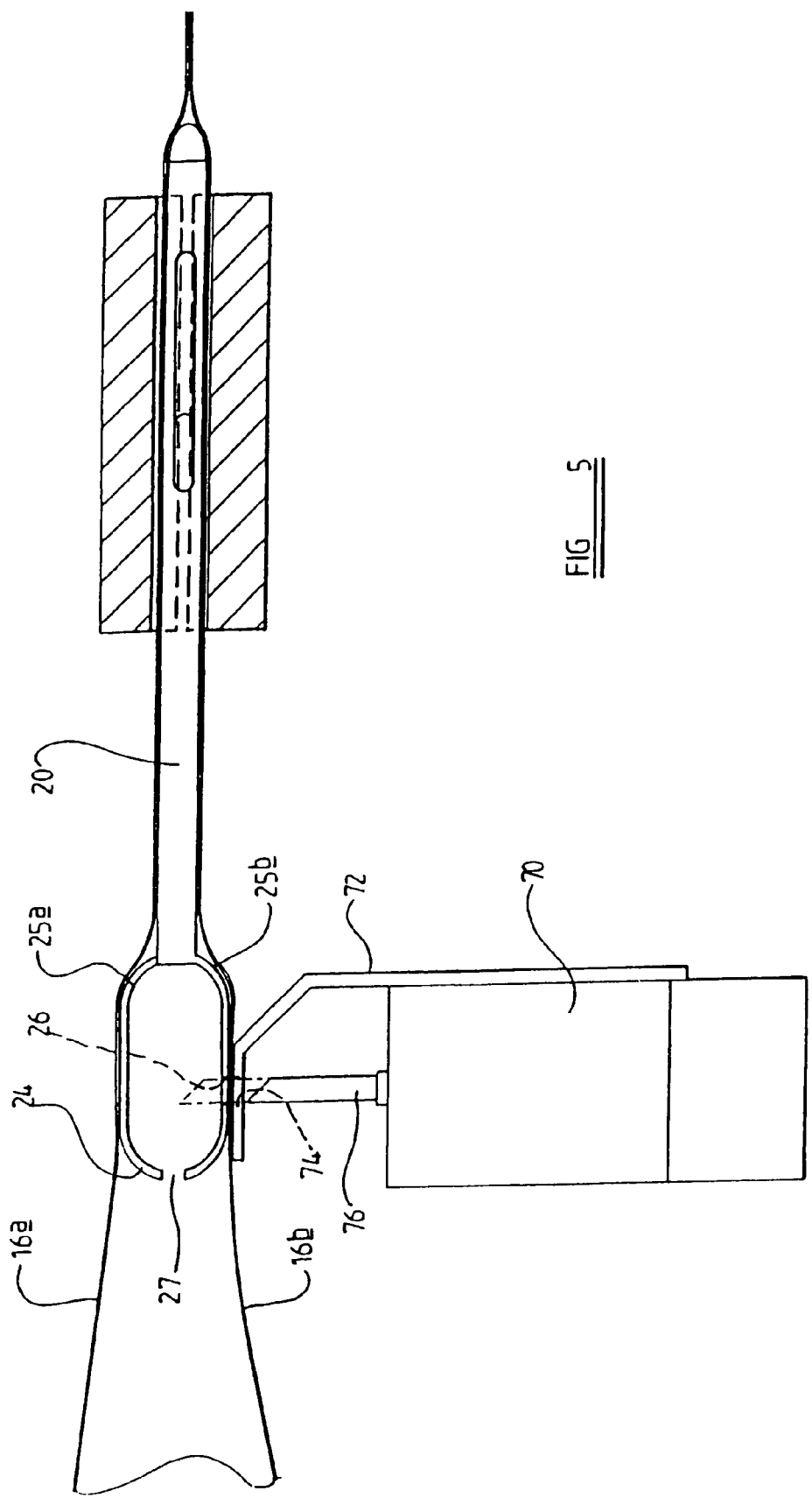
FIG. 5 is an enlarged view showing a separator member of the first embodiment.

Mounted a short distance in front of the guide roller 18 is a separator member 20, comprising a generally elongate, tubular body portion 21 from which side arms 22 extend laterally, said body portion extending in a tail housing 24 (see FIG. 5).

The tail housing 24 comprises upper and lower arms 25*a*, 25*b*, spaced apart for the purposes hereinafter described, as shown at 27 in FIG. 5.

The separator member is held captive in a separator retaining housing 30, comprising a lower portion 32 and an upper portion 34 connected to the lower portion by a hinge mechanism (not shown).

Figure 3:
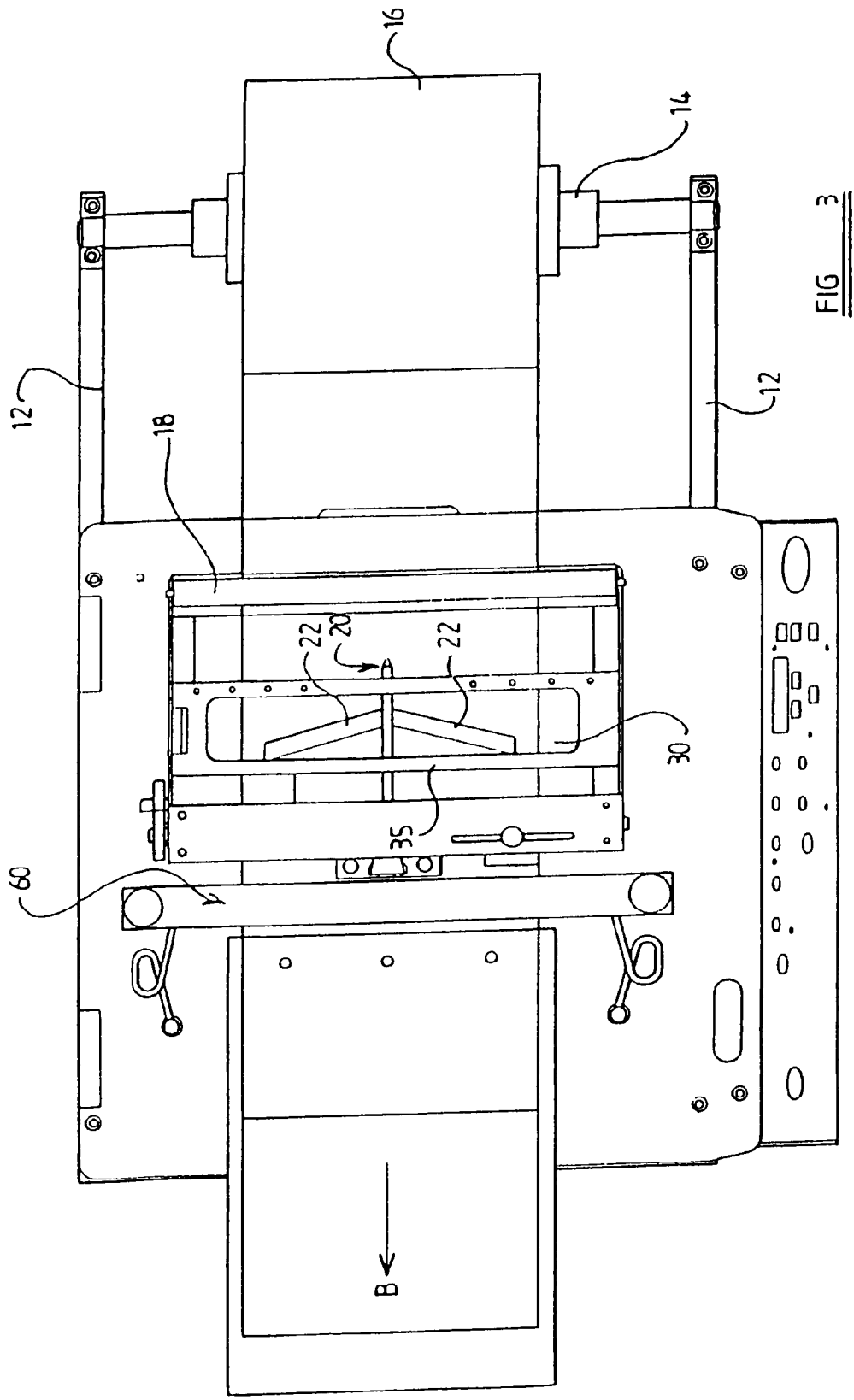
FIG. 3 is a sectional view of the machine, taken on the line III-III of FIG. 2.

The lower portion is provided with a peripheral wall 33, and in the transverse portions of these walls generally along the centerline of the machine shallow recesses 36*a*, 38*a* are provided. The upper portion 34 is similarly provided with a peripheral wall 35 (see FIG. 3), in an underside of which, at positions corresponding to the recesses 36*a* and 38*a*, corresponding shallow recesses 36*b* and 38*b* are provided.

Figure 6:
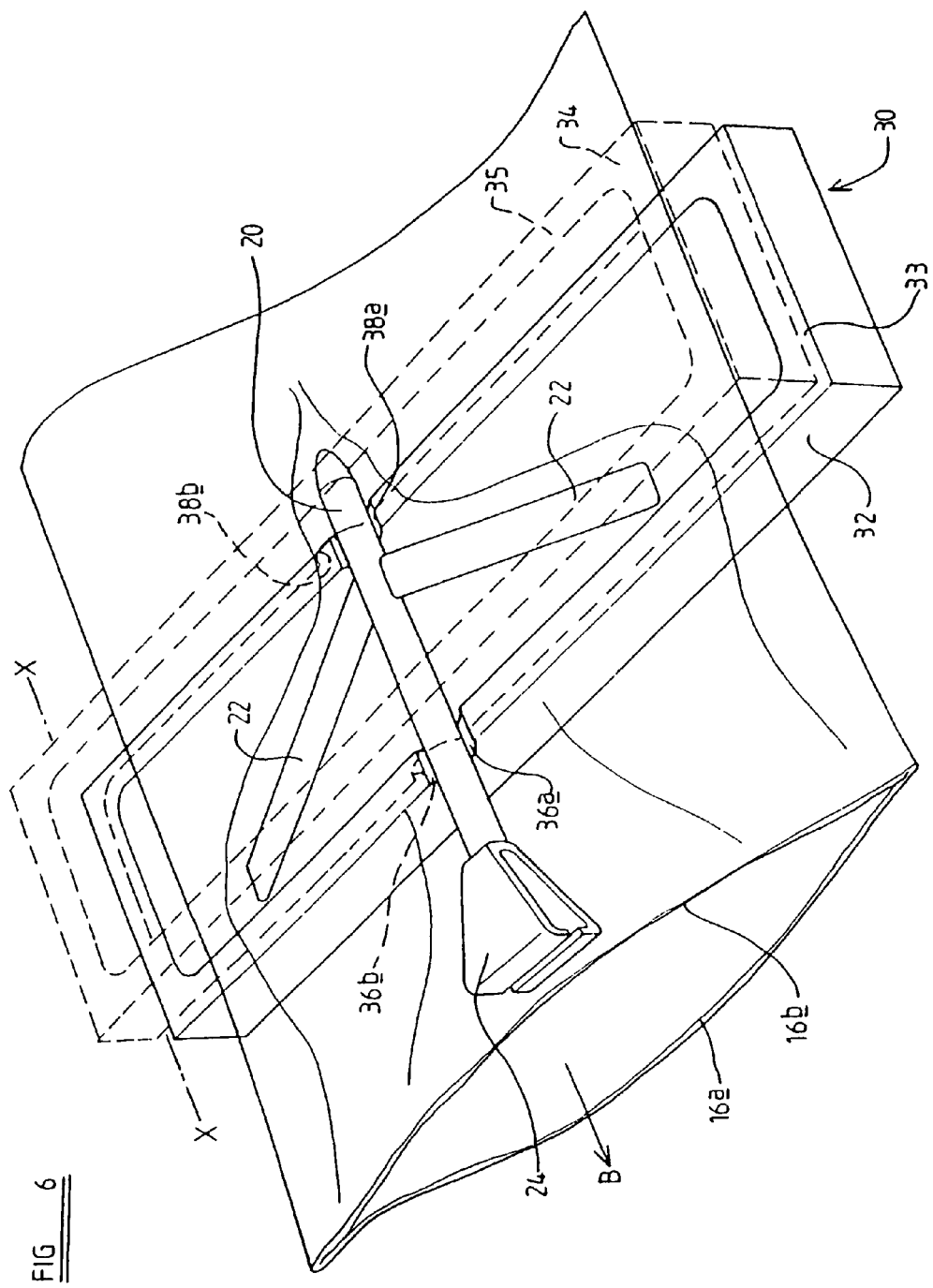
FIG. 6 is a perspective view showing the separator member retained in position within a separator housing of the machine.

The separator retaining member is shown in FIG. 6 in a closed position. However, by pivotal movement of the upper portion about an axis X, access to the interior of the separator retaining member may be gained.

In use, the separator member 20 is lifted from the lower portion 32 of the retaining housing 30, and a length of polythene tube is drawn from the roll 16 over the guide roller 18, and laid over the lower portion 32, and as shown in FIG. 6. The separator member is then manually inserted into the end portion of the tube, between the upper and lower walls 16*a*, 16*b*, the elongate tubular body of the separator member being placed on the shallow recesses 36a, 38a of the housing with the side arms 22 being located within the peripheral wall 33.

When the upper portion 34 of the separator retaining housing 30 is in its closed position, there is a small degree of separation between the peripheral walls 33 and 35 (also seen in FIG. 5), and while the separator member 20 is capable of limited axial movement, determined by engagement of the side arms 22 with the peripheral walls, the separator member is generally retained in a specific position within the machine, by the retaining housing 30.

In the setting of the machine, the leading end portion of polythene tubing is drawn from the supply roll 16 beneath the guide roller 18, and with the housing 30 open, across the lower portion 32 of the retaining housing, and the separator member is inserted manually into the end portion of the polythene tube. The upper portion 34 of the retaining housing is moved to its closed position, in which position the separator member is retained in position relative to the machine, but in which the polythene tubing may be drawn continuously in the direction of the arrow B over the separator member.

Figure 4:
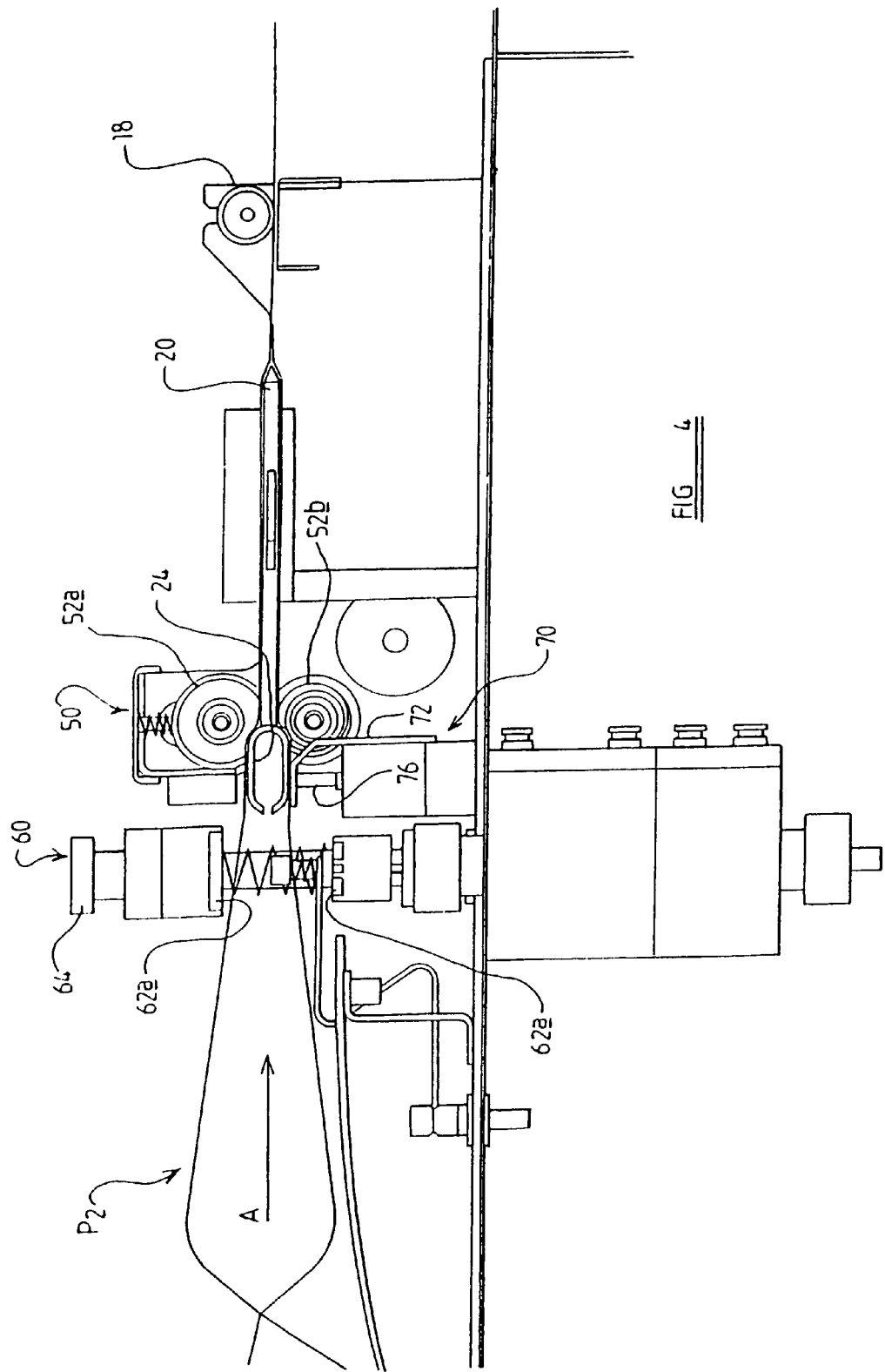
FIG. 4 is an enlarged view of part of FIG. 1.

In setting up the machine, the leading end portion of the tubing is drawn through drive mechanism 50, and through clamping mechanism 60, shown in FIG. 4.

The machine comprises an injector manifold 70 (see FIG. 5) mounted downstream of the drive mechanism 50, comprising a support bracket 72 located beneath the tail housing 24, said support bracket comprising an aperture 74 located directly adjacent to an aperture 26 provided at a central portion of the lowermost part of the tail housing 24 (see FIG. 5).

The injection mechanism also comprises an injection needle 76, and drive means (not shown) to move the needle in a vertical direction from a lowermost, inoperative position, shown in full lines in FIG. 5, to an operative position shown in dotted lines in FIG. 5 in which the needle projects through the aperture 74 in the support bracket 72, and through the aperture 26 in the lowermost portion of the tail housing 24, passing through the lower wall of the plastic tubing drawn over the separator member 20, the separator member 20 providing a support surface against which the lower wall of the tubing is pressed as the needle passes through the lower wall.

In practice although the separator member 20 is capable of limited movement within the retaining housing 30, such movement is insufficient to prevent the injector needle aligning correctly with the aperture 26.

Control mechanism of the machine (not shown in detail but indicated by the number 80) is operative, when the nozzle 76 is moved to its uppermost position, to inject a measured, adjustable volume of air through the needle 76, into the central region of the tail housing 24, i.e., between the upper and lower walls 16a, 16b of the polythene tubing 16 (see FIG. 5).

The clamping mechanism 60 is mounted a short distance downstream of the injector mechanism 70, comprising upper and lower heated clamping bars 62a, 62b, (see FIG. 4) and power means 64 operative under the control of the control mechanism to bring the clamping bars together to provide a transverse seal across the polythene tubing as it is drawn through the machine.

The drive mechanism 50 comprises upper and lower drive rollers 52a, 52b, operative to engage the plastic tubing therebetween, and to draw it in the feed direction B (FIG. 3) under the control of the control mechanism 80.

A cycle of operation of the machine will now be described, commencing at the position shown in FIG. 4, in which a quantity of air has just been injected through the injector needle 76 into a section of polythene tubing P2.

On retraction of the needle 76, the drive mechanism operates to advance the polythene tubing a short distance equal to the distance between the needle and the clamping bars, so that the aperture provided in the lower wall 16b is located directly above the lower clamping bar 62b. The operating mechanism causes the clamping bars to move together, against the action of internal springs, to cause the clamping mechanism to provide two lines of seal between the upper and lower sheets extending on opposite sides of the aperture; simultaneously providing a row of perforations or similar line of weakness between the seal lines, to complete manufacture of the air pillow P2. On completion of a brief dwell time the power means 64 is relaxed, allowing the clamping bars to separate, and a trigger signal applied to the control mechanism causes the drive mechanism to advance the polythene tube over the separator member.

Preferably the leading faces at least of the separator member are coated with PTFE or the like, to assist in the smooth gliding of the polythene over the separator member.

On completion of a desired distance of advance, operation of the drive mechanism is momentarily terminated, and the injector needle 76 is moved from its retracted to its advanced position, again puncturing the lower wall 16b of the polythene tube, to inject a measured quantity of air in the formation of a further pillow, as is shown in FIG. 4. Again, the needle 76 is retracted, and the polythene tubing is advanced to bring the aperture into position between the two sealing bars.

It will be appreciated that by the use of the invention above described, separation of the upper and lower walls 16a, 16b of the polythene tube is produced by the tail housing of the separator member, and is not dependant upon air injected into the tube.

Naturally, some flow of air rearwardly of the tail housing will take place, which may indeed assist the smooth flow of the polythene tube across the separator member 20, but this is incidental to the capability of the machine to provide a measured quantity of air injected between the walls 16a and 16b.

The control mechanism may comprise, in accordance with conventional practice, adjustment capability for varying the time of operation of the drive mechanism subsequent to the sealing operation, determining the length of the air pillow formed during successive operations of the machine; and the volume of air delivered by the injector needle 76, and the pressure to which the tube is filled.

By the invention above described air filled pillows may be obtained quickly and reliably, and with relatively few moving parts.

The second embodiment of the machine, shown in FIGS. 7 to 12, is similar in general to the first embodiment above described, and will be described hereinafter primarily only insofar as it differs in construction and operation from the first embodiment, and similar numerals, provided with the prefix number 1, have been utilized to identify similar parts.

In accordance with one aspect of the second embodiment, undriven support rollers 114 are utilized to support rolls 116 or 116a of a variety of sizes, from which thin-walled plastic tube may be drawn into the machine (see FIG. 7). Conveniently take-up mechanism (not shown) is utilized to provide a constant tension on the tube, and to accommodate for roll over-run.

In the second embodiment the support member 120 comprises a transversely extending tubular body portion 22, from which a longitudinal body portion 121a extends in the forward direction, and a body portion 121b extends in the rearward direction to a tail housing 124, the body portion 122 providing a continuous exterior tubular surface which has a diameter greater than the thickness of the body portions 121a or 121b (see FIGS. 5, 7, 8 and 9).

The drive means of the modified version comprises upper and lower drive 152b which are operative in the performance of the machine to draw plastic tubing from the supply, and simultaneously to retain the separator member in an operative position within the machine. Thus in the modified version the drive rollers 152a and 152b also perform the function of the retaining housing of the first embodiment.

Figure 12:
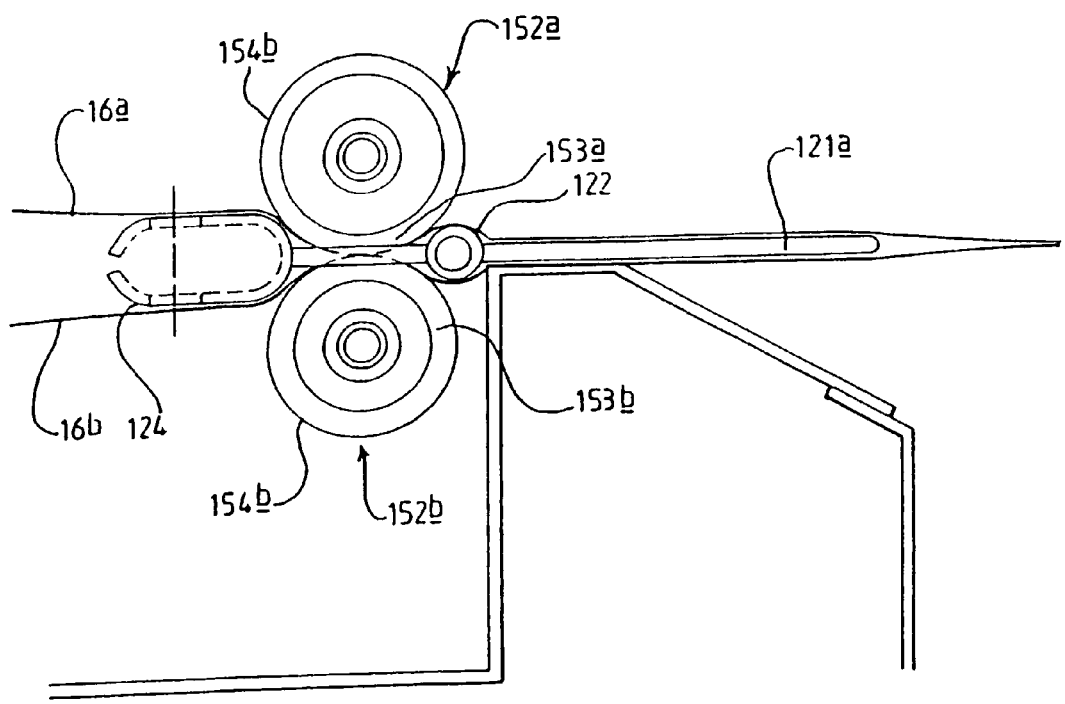
FIG. 12 is an enlarged side elevation showing the action of the separator member in separating the top and bottom sheet of the plastic tube utilized in the performance of this invention.

In particular, the rear body portion 121a is located in recessed or channel sections 153a, 153b of the drive rollers 152a, 152b. Sufficient clearance is provided between the surfaces of the drive rollers and the surfaces of the separator member to permit polythene tube to be drawn over the separator member as shown in FIG. 12, to cause separation of the upper and lower walls 16a, 16b of the tube so as to allow movement of an injector needle through an aperture 126 in the tail housing and through the bottom wall 16b, for the injection of air into the space between the top and bottom walls (see FIGS. 12 and 13).

Figure 10:
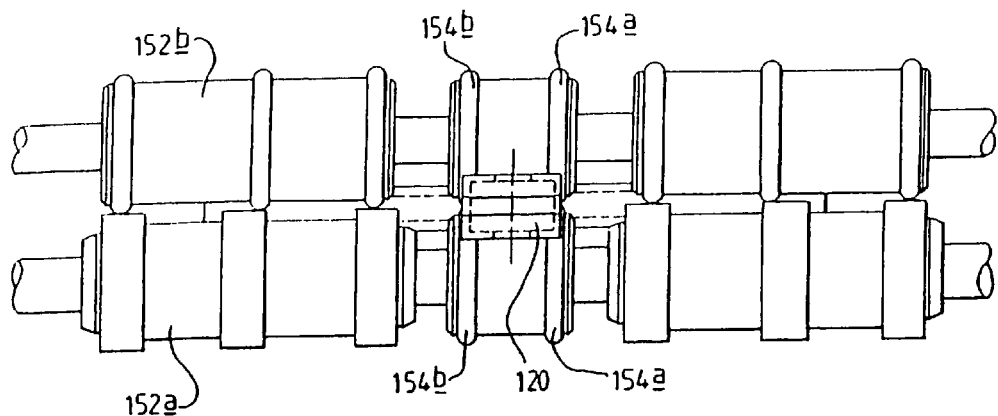
FIGS. 10 and 11 are respectively front elevation and plan views of the second embodiment, showing co-operation between the separator member and the drive means of the machine.
Figure 11:
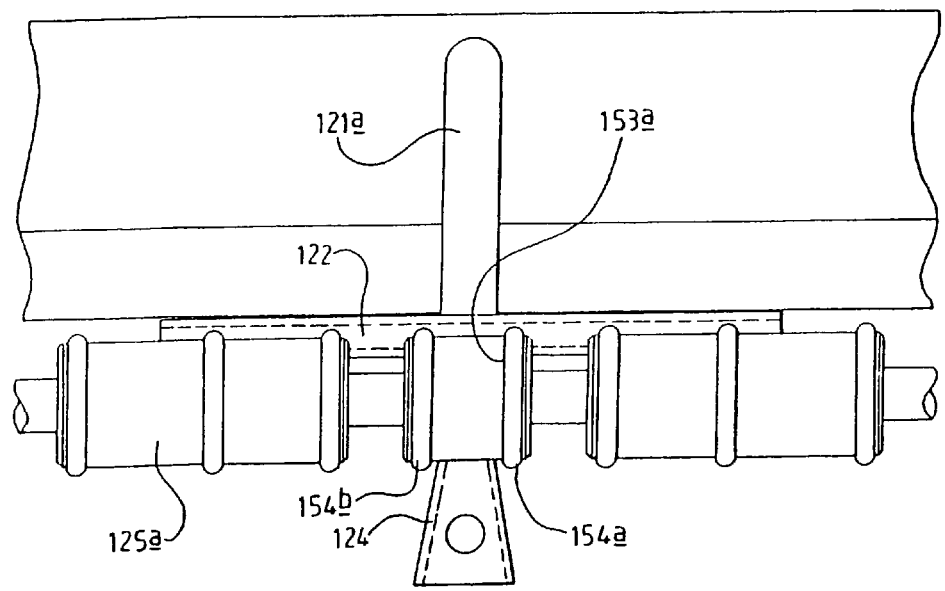

As will be appreciated, while engagement of the separator member with the drive rollers prevents any significant degree of movement of the separator member in the longitudinal direction, engagement of the rear housing 124 with the circumferential flanges 154a, 154b bounding the recesses 153a, 153b prevents any significant degree of lateral movement of the separator member (see FIGS. 10 and 11).

Conveniently in the modified version of the preferred embodiment the drive rollers 152a, 152b are mounted for separate movement in the setting up of the machine. Thus, tube is initially drawn from the supply roll 116, and the separator member 120 inserted manually into the leading open end of the polythene tube. The separator member is located as shown in the drawings between the drive rollers 152a, 152b, which may then be closed around the separator member into their operative positions, to draw tube from the supply around the separator member. The leading end portion of the tube is then manually drawn through the machine, through the clamping mechanism.

It will be appreciated that in the use of the machine, engagement of the separator member with the drive rollers is indirect, in that sheets of polythene are located between the separator member and the surfaces of the drive rollers.

Thus, conveniently the drive rollers are provided with a high friction coating, such as of rubber or the like, to assist in drawing the polythene tubing around the separator member.

In the present specification "comprise" means "includes or consists of" and "comprising" means "including or consisting of."

The features disclosed in the foregoing description and as incorporated by reference herein, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof. Such combinations extend to novel combinations of devices and methods expressly disclosed herein, alone or in combination with devices and methods incorporated herein by reference.

The invention claimed is:

1. An apparatus for manufacturing air-filled pillows, the apparatus comprising:

a plurality of support rollers to support a roll of material along an outer circumferential extent of the roll, wherein the support rollers are undriven rollers;

a driver for drawing the material from the roll along the support rollers, wherein the driver includes upper and lower drive rollers engaging the material to apply tension to the material;

an injector wherein, with the material formed as a tube including two opposing sheets, each sheet having first and second longitudinal edges, and the first longitudinal edges of the two sheets joined together and the second longitudinal edges of the two sheets joined together, the injector is configured for injecting air into an interior space between the two opposing sheets of the material drawn from the roll; and a sealer for sealing the two opposing sheets together with the injected air entrapped in the interior space there between.

2. An apparatus for manufacturing air-filled pillows, the apparatus comprising:

a support configured for supporting a supply of a material;

a drive mechanism configured for drawing the material from the supply;

an injector comprising an injection needle,
wherein, with the material formed as a tube including first and second sheets, each sheet having first and second longitudinal edges, and the first longitudinal edges of the two sheets joined together and the second longitudinal edges of the two sheets joined together, the injection needle is configured and disposed for making and extending through an aperture in the first sheet for injecting air into an interior space between the two sheets of the material drawn from the roll;

a blocking member that is configured to be placed between the first and second sheets, interposed between the injector and the second sheet; and a sealer configured for sealing the two sheets together with the injected air entrapped in the interior space therebetween.

3. The apparatus of claim 2, wherein the drive mechanism comprises drive rollers cooperatively associated to engage the material downstream from the supply.

4. The apparatus of claim 2, wherein:

the drive mechanism is configured for driving the tube to position the aperture in a predetermined position with respect to the sealer; and the sealer is configured to form seal lines on opposite sides of the aperture for joining the first and second sheets together injection location to entrap the injected air.

5. The apparatus of claim 4, further comprising a perforator configured for perforating the tube between the seal lines.

6. The apparatus of claim 2, wherein the sealer comprises a heating element configured to form a seal line joining the two sheets together and to entrap the injected air in the interior space.

7. The apparatus of claim 2, wherein the tube material is made of a polymer.

8. An apparatus for manufacturing air-filled pillows, the apparatus comprising:

a plurality of undriven support rollers configured to cooperatively support a roll of material along an outer circumference of the roll;

a drive mechanism for drawing the material from the roll that is supported by the support rollers;

an air introducer, wherein, with the material drawn from the roll comprising first and second sheets joined along at least one longitudinal edge thereof, the air introducer is configured for introducing air into an interior space defined between first and second sheet portions; and a sealer configured for sealing the first and second sheets together with the introduced air entrapped in the interior space therebetween.

9. The apparatus of claim 8, further comprising a support member disposed between and beneath the plurality of support rollers for supporting the roll when the material remaining has a diameter sufficiently small to fall between the plurality of rollers.

10. The apparatus of claim 8, wherein the plurality of support rollers comprises:

first and second of rollers configured to support the roll of material, and a third roller disposed between and beneath the first and second rollers for supporting the roll when the material remaining has a diameter sufficiently small to fall between the first and second rollers.

11. The apparatus of claim 10, wherein the third roller is undriven.

12. An apparatus for manufacturing air-filled pillows, the apparatus comprising:

a plurality of rollers configured to cooperatively support a roll of a material along an outer circumference of the roll;

a support member disposed between and beneath the plurality of support rollers for supporting the roll when the material remaining has a diameter sufficiently small to fall between the plurality of rollers;

a drive mechanism for drawing the material from the roll that is supported by the support rollers;

an air introducer, wherein, with the material drawn from the roll comprising first and second sheets joined along at least one longitudinal edge thereof, the air introducer is configured for introducing air into an interior space defined between first and second sheet portions; and a sealer configured for sealing the first and second sheets together with the introduced air entrapped in the interior space therebetween.

13. The apparatus of claim 12, wherein the support member comprises another roller.

* * * * *